J. A. ANDERSON.
DRY MASH FEEDER.
APPLICATION FILED MAR. 6, 1919.
1,322,218.
Patented Nov. 18, 1919.
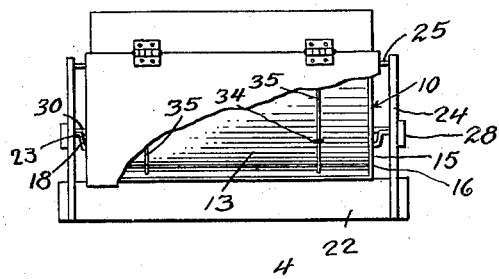
Fig. 3.
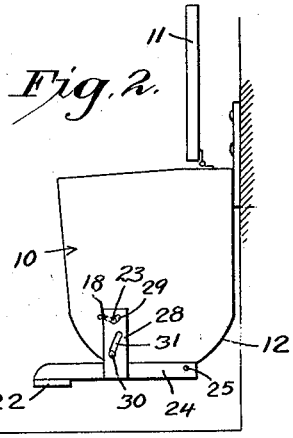
Fig. 2.
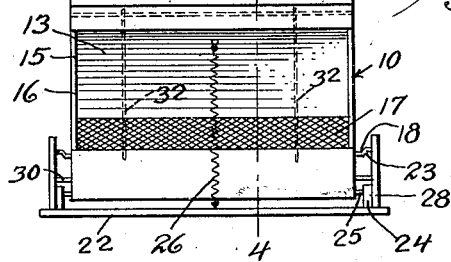
Fig. 1.
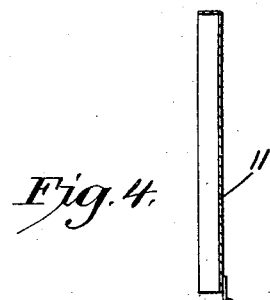
Fig. 4.
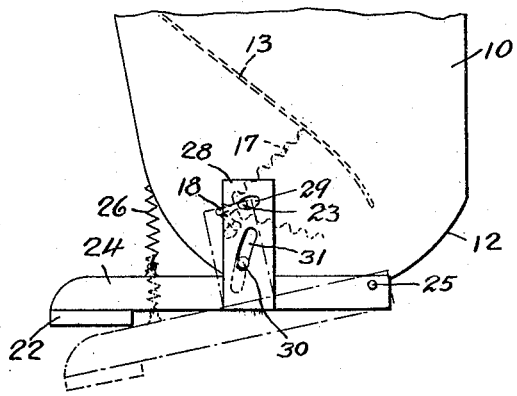
Fig. 5.
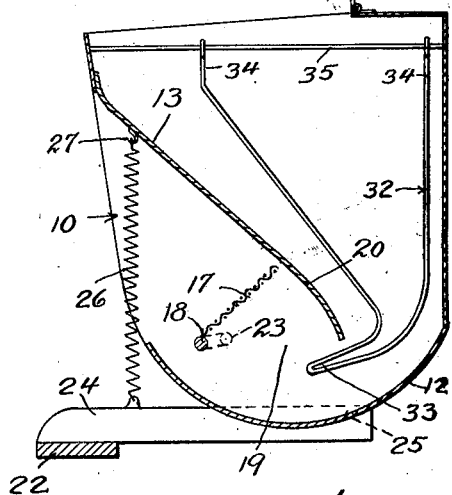
Inventor:
John Alfred Anderson
By Louis M. Schmidt,
Atty.

UNITED STATES PATENT OFFICE.

JOHN ALFRED ANDERSON, OF NEW BRITAIN, CONNECTICUT.

DRY-MASH FEEDER.

1,322,218.  Specification of Letters Patent.  Patented Nov. 18, 1919.

Application filed March 6, 1919. Serial No. 281,036.

*To all whom it may concern:*

Be it known that I, JOHN ALFRED ANDERSON, a citizen of the United States, residing at New Britain, in the county of Hartford and State of Connecticut, have invented certain new and useful Improvements in Dry-Mash Feeders, of which the following is a specification.

My invention relates to improvements in dry mash feeders for use for feeding poultry and the object of my improvement is to produce a feeder that is adapted to contain an appreciable supply of dry feed, such as dry mash, and having a trough-like structure at the lower portion wherein is exposed a portion of the feed so as to be accessible to the poultry, the said structure being provided with a guard, preferably of foraminous material, that normally prevents such access and which is automatically withdrawn from the guarding position by means of tripping mechanism that is operated by the weight of the poultry, as of one or more fowls, when in position for feeding.

In the accompanying drawing:—

Figure 1 is a front elevation of my improved dry mash feeder.

Fig. 2 is an end elevation of the same.

Fig. 3 is a plan view of the same with the top partly broken away.

Fig. 4 is a sectional view on the line 4—4 of Fig. 1.

Fig. 5 is an end elevation, on an enlarged scale, of the lower portion of the feeder.

My improved dry mash feeder comprises a box-like body 10 for containing the feed provided with a cover 11 at the upper end and having the lower end portion 12 rounded from the rear wall across the bottom and toward the front, to suitably serve as a trough. The front wall 13 extends downwardly so as to be positioned at about the middle portion of the trough 12, the bottom edge being separated from the bottom by a space for admitting feed from the interior space of the body 10 to the front portion of the trough 12 so as to be accessible for the fowls.

The end walls 15 are extended forwardly beyond the body 10 appreciably so as to provide side plates 16 at the ends of the structure that serve as closures for the ends of the trough 12 and as supports for the operating mechanism to be described.

The said mechanism comprises a guard 17, which, as shown, is made of foraminous material, is pivotally supported along the front edge by means of a shaft 18, and extends rearwardly from the said shaft 18, with the rear edge normally adjacent the front wall 13, suitably to form a closure for the open or exposed portion 19 of the trough 12, being adapted to swing downwardly so as to expose and give access to a part of the feed in the trough 12.

The portion 20 of the front wall 13 that is opposed to the guard 17 is curved and eccentric relatively to the shaft 18 and is positioned so as to fit against the rear edge of the guard 17 when the guard is in the normal upper and closed position and to provide an open feeding space along the said rear edge when the guard is deflected downwardly from said normal position.

The mechanism for operating the guard 17 comprises a treadle 22 and the means for interconnecting the said treadle and the guard I prefer to provide in duplex form, one at each end, so as to insure positiveness of action, and comprises a crank 23 at each end of the shaft 18.

The treadle 22 extends along the front of the lower part of the structure and is supported by a pair of side arms 24 at the ends.

The said arms 24 are pivotally supported from the sides of the trough 12 by means of pivotal pins or shafts 25, which extend forwardly from the pivotal supports, and support the treadle 22 at their front end portions.

A spring 26 connected to the middle of the treadle 22 at the lower end and having the upper end properly supported, as by means of a hook 27 on the front wall 13, tends to lift the treadle 22 and operates so as normally to hold the treadle in the uppermost position.

The side arms 24 have each an upwardly extending portion 28 that is positioned adjacent the rear of the shaft 18.

Means for connecting the side arms 24 with the crank 23 comprise for each side a cam slot 29 in the extension 28 for receiving the end of the crank.

The front extensions 16 of the side walls 15 support the shaft 18 and also support laterally projecting pins 30 that are positioned intermediate the shaft 18 and the pivotal supports 25 for the side arms 24.

The said pins 30 serve as stop pins and project through cam slots 31 in the side arm extensions 28, the said slots 31 being of suitable size and form for permitting the desired downward movement of the side arms 24 and permitting of free movement thereof intermediate the limited upper and lower positions. The pins 30 and slots 31 also limit the upward movements of the parts. The upward movement of the parts is due to the operation of the spring 26. In the lowermost position, to which position the parts are brought by depressing the treadle 22, the stop pins 30 support such load as may be applied to the treadle 22, and which load, when the device is in use, will range from one fowl only to as many as may be accommodated on the treadle 22.

The device is set up in position for use with the treadle 22 in position so that the fowl will alight thereon for feeding, and the spring 26 is adjusted so that one only of the fowl for which the device is adapted will be sufficient to move the guard away from the guarding position when supported by the treadle 22.

In the interior of the body 10 I provide a plurality of swinging agitating devices 32 for agitating the mass of the feed contained in the body 10 that extend through the space between the bottom edge of the front wall 13 and the bottom wall 14 of the trough 12 and have a nose 33 at the front end that is positioned in the front portion of the trough 12, suitably to be actuated occasionally by the bills of the fowls feeding from the trough 12.

The agitators 32 are, as shown, formed each of a piece of wire having the middle portion provided with a return bend and suitably curved to form the contacting nose 33, the end portions 34 extending upwardly through the body 10 and being spread apart in generally V-form, the extreme upper ends being loosely mounted on a supporting shaft 35 that extends from front to rear through the body 10.

By providing a proper number of the agitators 32 the mass of feed in the body 10 will be disturbed by such lateral swinging movement of the agitators as will be effected by the fowl in actuating the nose 33 that is embedded in the part of the feed that is exposed and accessible when the device is in use for feeding to a sufficient extent to prevent clogging of the mass.

I claim as my invention :—

1. A dry mash feeder comprising a container body having a trough structure at the lower end, the said trough structure being connected to the said body by a passage and having an exposed portion at the front of the said body, a pivotally supported guard constructed and arranged to bridge the said exposed portion in one position and to permit of free access to the said exposed portion in another position, a pivotally supported treadle in front of the said exposed portion, a spring tending to raise the said treadle and operative to yield to gravity pressure on the said treadle, means interconnecting the said treadle and guard for moving the guard responsive to movements of the treadle and the said guard having the pivotal axis adjacent the front side of the said exposed portion and being operative to swing downwardly into the trough structure for uncovering the said exposed portion.

2. A dry mash feeder as described in claim 1 and having means for limiting the movement of the pivotally supported parts.

3. A dry mash feeder comprising a container body, a trough structure at the lower end of the said container having an open portion extending along the front wall, a guard hinged to the said body and operative in one position to bridge the said open portion, means operative normally to hold the said guard in the said one position, treadle operated means for moving the said guard away from the said one position, so as to give access to the said open portion and the parts being constructed and arranged so that the said guard is positioned generally approximately horizontally when in the closed position and swings downwardly into the trough structure for uncovering the said exposed portion.

JOHN ALFRED ANDERSON.